July 22, 1952   R. W. WENGEL   2,604,002
OPTICAL INFINITY SIGHT
Filed Nov. 28, 1944   5 Sheets-Sheet 1
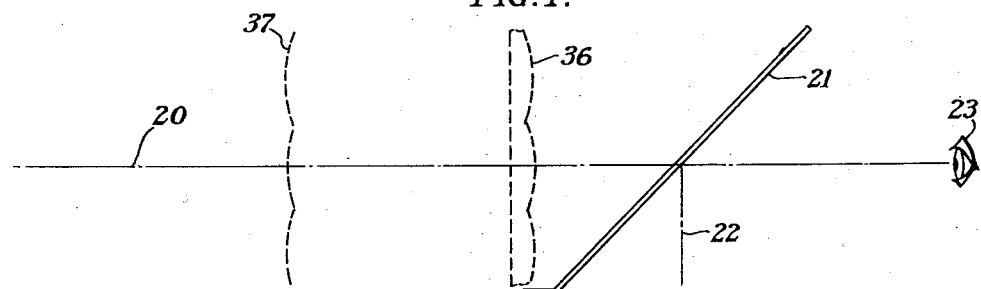
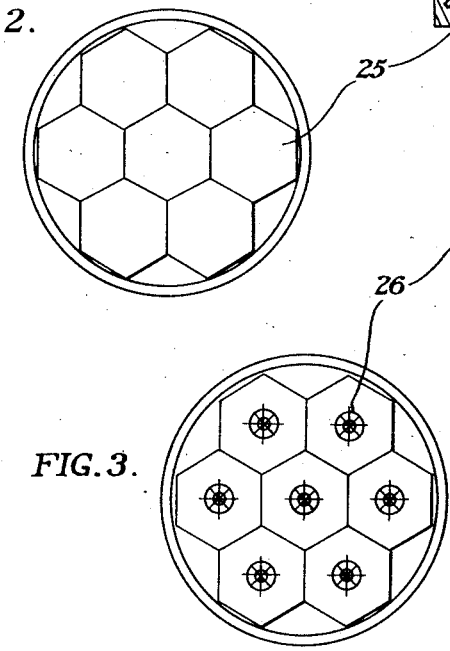
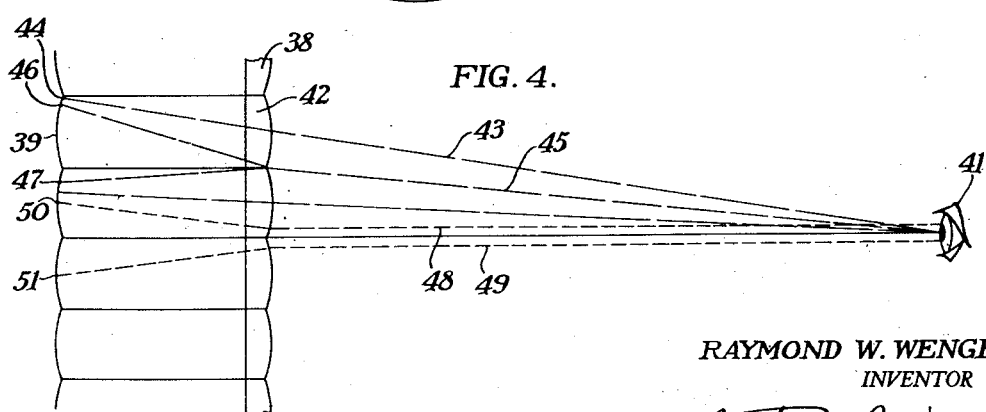
RAYMOND W. WENGEL
INVENTOR
ATT'Y & AG'T July 22, 1952     R. W. WENGEL     2,604,002
OPTICAL INFINITY SIGHT
Filed Nov. 28, 1944     5 Sheets—Sheet 2
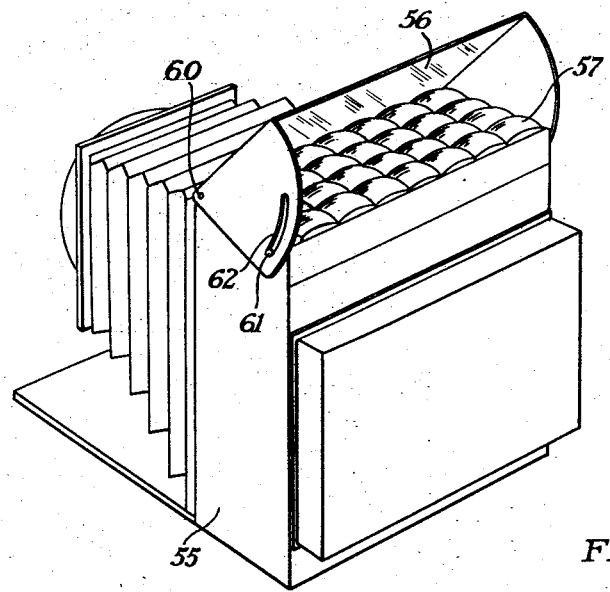
FIG. 5.
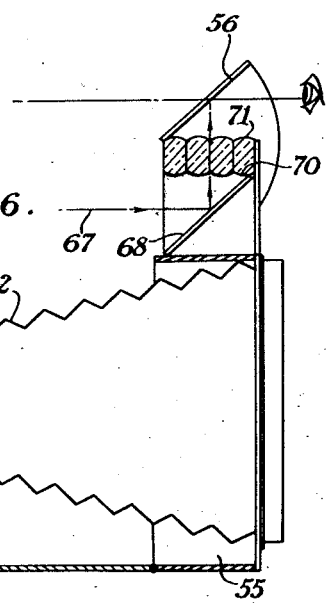
FIG. 6.
FIG. 7.
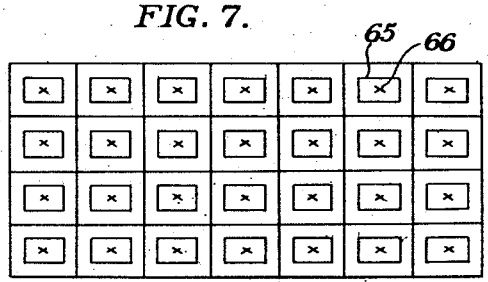
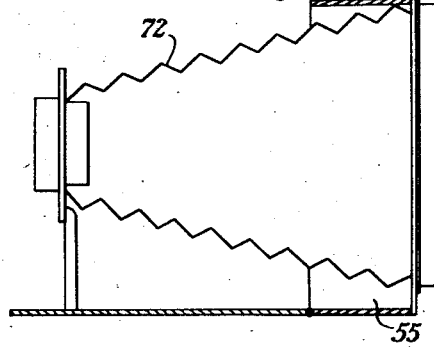
FIG. 8.     FIG. 9.     FIG. 10.
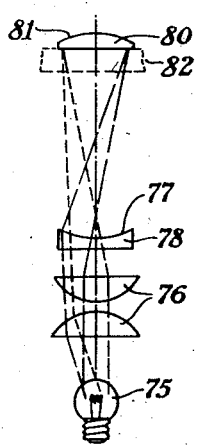 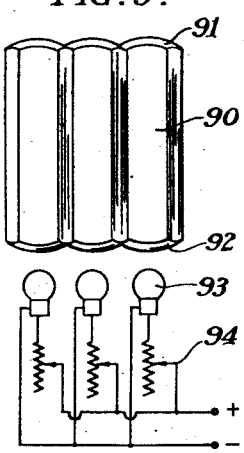 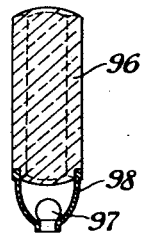
RAYMOND W. WENGEL
*INVENTOR*
BY *Newton M. Perkins*
*F. M. Emerson Holmes*
ATTY & AGT July 22, 1952 R. W. WENGEL 2,604,002
OPTICAL INFINITY SIGHT
Filed Nov. 28, 1944 5 Sheets-Sheet 3

RAYMOND W. WENGEL
INVENTOR

BY
ATT'Y & AG'T

July 22, 1952 R. W. WENGEL 2,604,002
OPTICAL INFINITY SIGHT
Filed Nov. 28, 1944 5 Sheets-Sheet 4
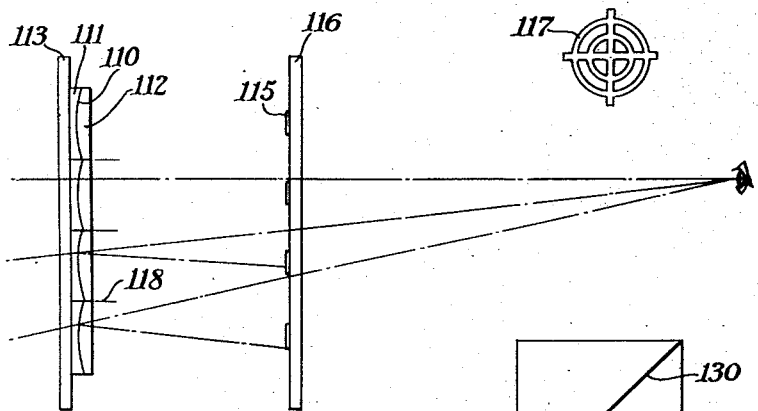
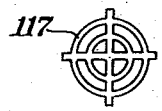
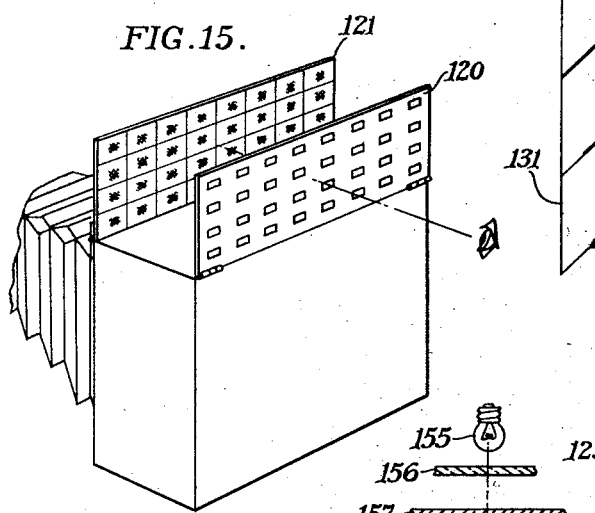
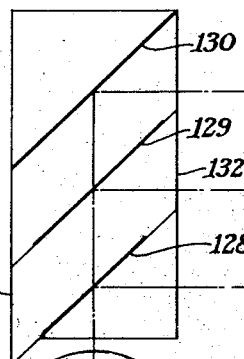
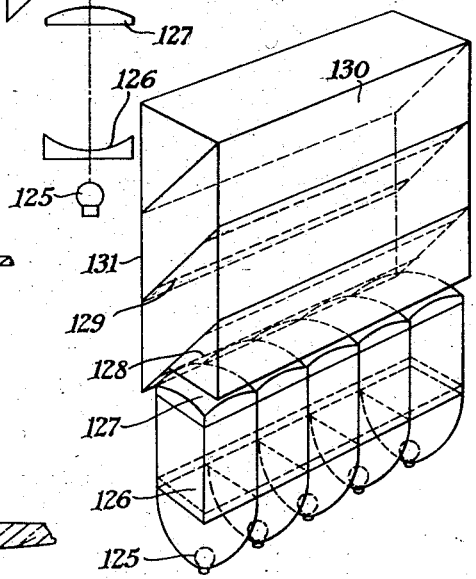
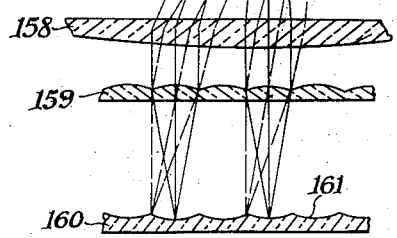
RAYMOND W. WENGEL
INVENTOR
ATT'Y & AG'T July 22, 1952   R. W. WENGEL   2,604,002
OPTICAL INFINITY SIGHT Filed Nov. 28, 1944   5 Sheets-Sheet 5

RAYMOND W. WENGEL
INVENTOR
BY
ATT'Y & AG'T

Patented July 22, 1952

2,604,002

UNITED STATES PATENT OFFICE 2,604,002

OPTICAL INFINITY SIGHT

Raymond W. Wengel, Rochester, N. Y., assignor to Eastman Kodak Company, Rochester, N. Y., a corporation of New Jersey Application November 28, 1944, Serial No. 565,530

1 Claim. (Cl. 88—1.5)

This invention relates to infinity sights such as used as gunsights or as camera view finders.

An infinity sight is free of parallax errors caused by movement of the observer's eye, since by definition it is one which makes the reticle or other fiducial mark appear superimposed on the target or object being viewed, which for sighting purposes can be considered as at infinity. The commonest form of such sight is actually arranged to have the fiducial mark such as the view finder frame imaged effectively at infinity, but the term "infinity sight" is commonly used generically to include those systems in which the reticle image may actually be at some finite distance such as fifteen feet. This custom will be adopted throughout the present specification and claim since the invention is equally applicable to all such modifications of infinity sights and the advantages are the same whatever form is used, so long as the fiducial mark appears approximately to coincide with the target.

All prior infinity sights have for various reasons been limited to a relatively narrow and hence objectionable exit pupil. In the use of such sights the observer has been required to hold his eye in alignment with a small eyepiece or in front of a small reflector whose effective diameter can be no greater than that of the collimator lens used in the system. The object of the present invention is to extend the effective exit pupil of an infinity sight beyond that previously obtainable so as to allow considerable freedom of movement of the head while using the sight. In fact there is no theoretical upper limit to the size of the exit pupil obtainable.

Various embodiments of the present invention have their individual advantages and objects such as compactness, simplicity of manufacture, the elimination of auxiliary light sources, the ability to be assembled at will to any desired size of exit pupil, and the property of combining with stereoscopic vision when used binocularly. These individual advantages and the method in which they arise will be apparent from the detailed description given below. The main feature which is fundamental to all embodiments however is the fact that according to the present invention an infinity sight is made up consisting of a plurality of juxtaposed collimators having substantially identical fiducial marks at the focus of each collimator. To cover a useful area there should be at least four such collimators with their axes parallel and at the corner of a parallelogram. One particularly useful simple embodiment has seven such collimators, one of which is completely surrounded by the others, but in each case the exit pupil is extended by the simple addition of more collimators similarly juxtaposed. With due allowances for slight variations in certain embodiments of the invention, it can be stated that the optic axes of the collimators are substantially parallel to one another and that some means is usually provided for preventing light from any reticle reaching any collimator other than the one to which it corresponds. This latter feature is not absolutely necessary of course as the stray light usually passes harmlessly to one side and does not reach the observer's eye in any objectionable quantity.

One embodiment of the invention uses simple positive lenses as collimators of moderate relative aperture, and these are perfectly satisfactory since there is little advantage to be gained by having a large relative aperture; the latter feature was considered absolutely essential in prior sights in order to get a useful exit pupil. Of course with the present invention one uses the largest aperture which is commensurate with other requirements (definition, simplicity, etc.) since larger apertures reduce the number of collimators required to cover any given exit pupil. A fiducial mark is located at the focus or approximately at the focus of each of the simple elements and a semi-transparent mirror is employed for combining the collimated beams from the lenses with light from the target or object being viewed. The diameter of each lens must be approximately as large as the reticle or larger in order to avoid excessive space between lenses. The spacing should be less than the pupil of the observer's eye; otherwise the lines are objectionably apparent.

A different embodiment of the invention employs concave reflectors (semi-reflectors) as the collimating elements and simultaneously as the beam combining means. That is, the target is viewed directly through the concave semi-reflectors which also act to collimate light from their respective reticles.

In both cases the reticle can be exactly at the focus of the collimating element so that the reticle image appears exactly at infinity or, in order to provide an apparent reticle at some finite distance, the actual reticle can be positioned at a distance from the element conjugate to this finite target distance. Since this displacement of the reticle from the true focal plane is only very slight, the elements may still be properly referred to as collimators or approximate collimators. Since the sight according to the present invention can be made up with any effective exit pupil, merely by extending the number of collimator units, it can be used binocularly, which for many purposes is an advantage. With many sighting devices it is common to judge distance stereoscopically while using the device and for this purpose it would be convenient to have the apparent distance of the reticle (determined stereoscopically rather than or along with the determination of this distance by the focusing of the collimator) fixed equal to some critical distance required such as the range of a gun for example. In this case the collimators do not have their axes or effective axes parallel to one another, but are arranged so as to appear to diverge from a point at the critical distance. With such an arrangement for example the reticle viewed stereoscopically can be made to appear at 25 feet say. Preferably each collimator in this case is arranged to have the image in focus at 25 feet, but the stereoscopic effect is still apparent even with reticles focused at infinity.

In the embodiment of the invention employing positive lenses as collimators and a semi-transparent plane reflector as the beam combining member, it is a relatively simple matter to extend the exit pupil in one direction namely that parallel to the axis of the collimator lens simply by having a succession of semi-transparent reflectors parallel to each other, preferably so that the shift from one reflector to the next is not discernible. The present invention can be easily combined with such an arrangement by having juxtaposed collimators for extending the exit pupil laterally which is not possible with the multiple beam combiners alone. This system can be modified further by having a single beam combining mirror to receive the light from all of the succession of semi-transparent reflectors and to direct the beams into alignment with the light from the target.

By the present invention exit pupils can be made so large that the relative thermal expansions of the collimator elements and the reticles have an effect which not only is noticeable but is objectionable unless care is exercised to insure that the expansion coefficients are approximately the same. In a preferred embodiment of the invention the lenses are cemented to a fused quartz plate with small spacings between the lens elements; this spacing is less than the pupil of the observer's eye so as not to be apparent. The spacing allows expansion of each lens separately whereas the total expansion of the unit is dependent only on the quartz plate. Similarly the reticles are mounted on quartz or on some metal alloy whose thermal expansivity approximates that of quartz. Of course, glass might be used for both supports but in general it is easier to insure similarity of expansion if both plates have low coefficients.

The reticles for the invention may be manufactured in any of the standard manners. When a photographic process is used, there is one particular system which has the added advantage of automatically insuring that all of the reticles will be effectively identical and correctly placed. Fundamentally this consists of having a photosensitive layer in the reticle plane (curved or flat) and exposing this layer through the collimator lenses to light from a greatly enlarged drawing of the proposed reticle located effectively at infinity. Actually a large collimator lens receives light from the master reticle, collimates this light and directs it simultaneously through all of the sight collimators to expose the photosensitive layer. The layer is then processed in any of the standard manners to constitute the reticle.

The invention and its objects will be fully understood from the following detailed description of the various embodiments thereof when read in connection with the accompanying drawings in which:

Fig. 1 is a vertical cross-section partly diagrammatic of a simple but very satisfactory embodiment of the invention.

Fig. 2 is a plan view of the collimating elements of Fig. 1.

Fig. 3 is a plan view of the reticles of Fig. 1.

Fig. 4 diagrammatically illustrates the operation of the device shown in Figs. 1 to 3.

Fig. 5 is a perspective view of a camera incorporating the present invention as a view finder.

Fig. 6 is a vertical section of the camera shown in Fig. 5.

Fig. 7 is a plan view of the reticle employed in the arrangement shown in Figs. 5 and 6.

Figs. 8, 9, and 10 show alternative arrangements which can be used in the embodiments shown in Figs. 1 to 7.

Figure 11:
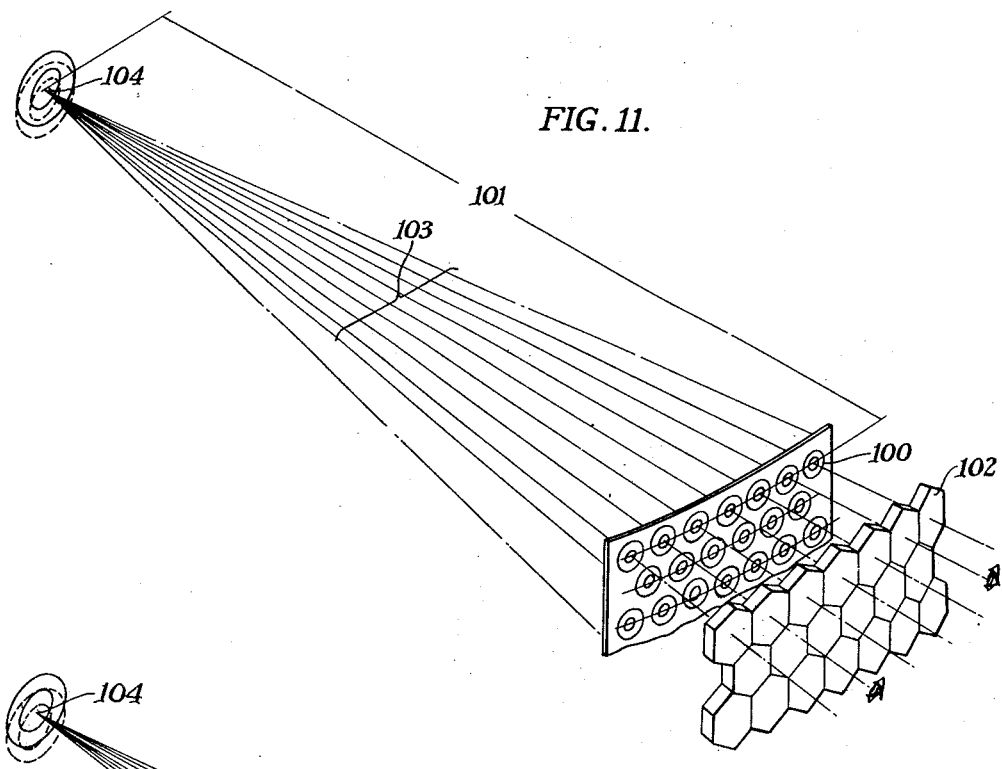
Figure 12:
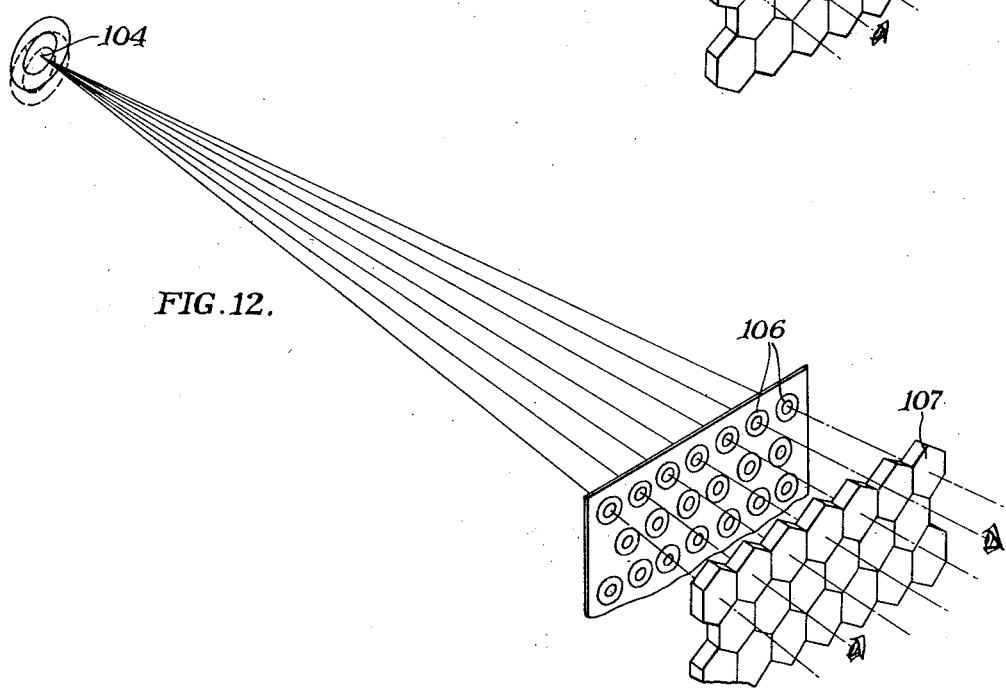

Figs. 11 and 12 are diagrammatic perspective views to show alternative arrangements of the present invention combined with stereoscopic judging of distance.

Fig. 13 is a vertical section of a preferred embodiment of the invention employing semi-transparent concave reflectors as collimators.

Fig. 14 is a front view of one of the reticles used in Fig. 13.

Fig. 15 illustrates the application of the embodiment shown in Fig. 13 to a camera view finder.

Figs. 16 and 17 are respectively a vertical section and a perspective view of a special embodiment of the present invention in which vertical extension of the exit pupil is obtained by successive reflectors.

Figure 18:
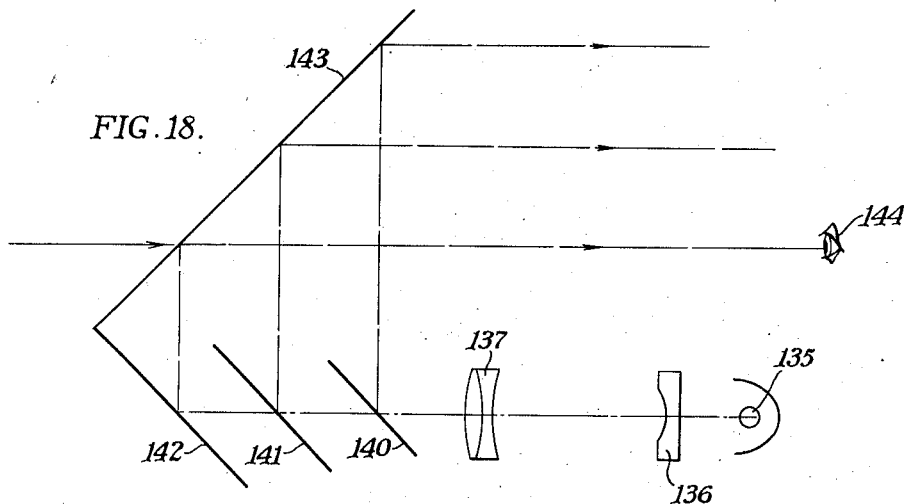

Fig. 18 shows a preferred embodiment of the invention incorporating a number of features which are independently applicable to the other embodiments.

Figure 20:
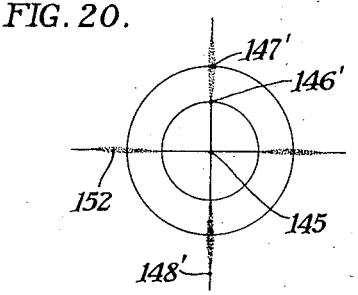
Figure 19:
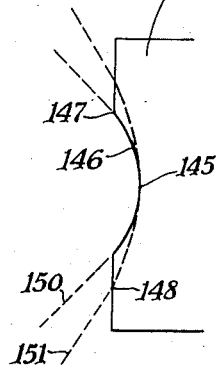

Figs. 19 and 20 illustrate the function of the particular reticle shown in Fig. 18, Fig. 20 representing the apparent image seen by the eye.

Figure 21:
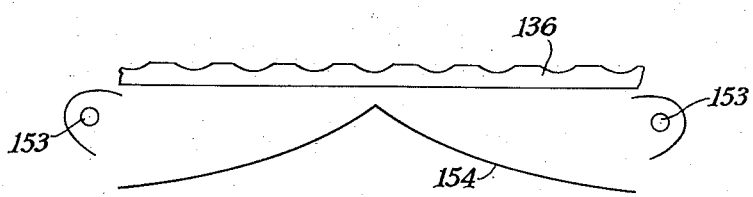

Fig. 21 shows an alternative form of illumination for the reticle.

Fig. 22 illustrates a preferred method of making reticles for the present invention.

In Fig. 1 light represented by a ray 20 from a target or object to be viewed is combined at a semi-transparent reflector 21 with a beam 22 from a collimator so that both beams are simultaneously received by the eye 23 of an observer. According to the invention a plurality of positive lenses 25 are juxtaposed each to act as an individual collimator with little or no apparent dividing line between the units. At the focal plane of each collimator there is engraved a reticle 26 and in the preferred embodiment shown this reticle is on a curved surface matching the field of the simple lens element 25. For convenience in manufacture the individual lenses are cemented to a glass plate 27 and the elements 28 on which the reticles are engraved are similarly carried by a glass plate 29 which is preferably light diffusing to insure uniform illumination of the reticle.

In this particular figure all of the reticles are illuminated by a single lamp 31 and reflector 32, but as pointed out later individual illumination of the reticles is permissible.

The circuit for the lamp 31 is shown diagrammatically including a power source 30, a switch 33, and a variable resistance 34 whereby the intensity of the illumination may be adjusted to any convenient value.

For convenience in describing the operation of the collimators the effect of the beam combiner 21 can be taken into account and the collimators 27 can be considered as effectively located at the position indicated at broken lines 36. Similarly the reticles 26 can be considered as effectively at the position indicated by broken lines 37.

The effect then can be shown as in Fig. 4, the mirror 21 being omitted. In Fig. 4 juxtaposed positive elements 38 collimate light from reticles located on curved surfaces 39. The eye 41 of an observer receives light from each of the collimators and sees an apparent image of each reticle at infinity. The displacement of one reticle relative to the other at infinity is of course quite negligible so that the images appear superimposed. In fact the eye in any one position may see only part of the reticle for any one collimator, but the rest of the reticle image will be made up by adjacent collimators so that a single complete reticle image is seen.

Due to collimator 42, the ray 43 and all rays parallel thereto arriving at the eye appear to come from that point 44 of the reticle which is near the edge thereof. Similarly the ray 45 may come from the point 46 or the corresponding point 47 of the adjacent collimator. If the eye 41 were located exactly on the optic axis of one collimator, it would, of course, see the exact center of the reticle straight ahead and through that particular collimator. However, if the eye is shifted slightly as shown in Fig. 4 so that it is in line with one of the dividing lines between collimators, it still sees the center point of the reticle straight ahead as shown by rays 48 and 49 which come from the identical center points 50 and 51 respectively.

The rays 48 and 49 are separated by the width of the observer's pupil to illustrate why there is no apparent break as the line of sight shifts from one collimator to the next. At each dividing line it is obvious that the eye is receiving light from both of the adjacent collimators. Thus in Fig. 4 the observer's eye 41 for all vertical locations thereof will receive light parallel to rays 48 and 49 only from the center of one or other of the reticles and light parallel to the line 45 from another definite point in each reticle, thus giving an enlarged virtual image of the reticle at infinity.

In Figs. 1 to 4 the reticle is shown as crossed lines with concentric circles which is the type most useful in gunsights, but the advantages of the invention are equally obtainable in camera view finders wherein the reticle must correspond to the field of view of the camera. The correspondence is not usually absolutely exact since it is preferable to have the camera cover a field just slightly greater than that represented by the view finder.

In Figs. 5, 6, and 7 a camera 55 is provided with a view finder consisting of a semi-transparent mirror 56 and a plurality of juxtaposed collimators 57. The mirror 56 is hinged at the point 60 so as to be a protection for the collimators when closed and so as to be accurately at 45° (or other predetermined angle to the line of sight, the collimators being accordingly oblique) when in the open position determined by the stop 61 in the curved slot 62. The reticles in this case as indicated in Fig. 7 are rectangles 65 with central crosses 66 to indicate the center point of the field. The reticles are illuminated from below by light 67 striking a light diffusing or mirror surface 68. The reticles are engraved as transparent lines on opaque curved surfaces 70 which are integral with the collimator lens 71 and have a curvature to match the field of this lens 71. With this arrangement the frame appears as a bright rectangle superimposed on the object being viewed and photographed. The relative brightness of this frame line depends on the ratio of the transmission to reflection of the semitransparent reflector 56. If this surface is highly transmitting and only slightly reflecting, the frame will be only slightly brighter than the object being viewed, but if the surface 56 has a relatively high density to transmitted light and relatively high reflection, the frame appears quite bright. The need for an auxiliary light source to illuminate the reticles is not so great in the case of a camera view finder, since cameras are only used in bright daylight or under other conditions of bright illumination which can be partly diverted as by the bright surface 68 to illuminate the reticles. This surface 68 is preferably diffuse as pointed out above and need not be flat or at any particular angle, except that certain arrangements are more efficient than others. The illumination on the reticles can even be increased if desired by having the upper surface 72 of the camera bellows white.

Fig. 8 shows one particularly highly efficient form of collimator unit in which a lamp 75 through a condenser lens system 76 illuminates a reticle 77 engraved on a plano-concave lens 78. The collimation of the light from the reticle 77 is provided by a plano-convex lens 80 whose front surface 81 may be either spherical or aspherical. For example this surface may be spherical with a radius of curvature of 34.9 mm. when this front element is made of glass having an index of refraction 1.69 and a dispersive index 56.1 and an axial thickness of 3.5 mm. In this case the axial distance between the plano rear surface of the element 80 and the reticle 77 should be 47.3 mm. (air). At a distance of 4.8 mm. from the axis the best image is produced by a point .81 mm. in front of the axial center of the reticle. That is, the distance from the lens 80 to this marginal point of the reticle should be 46.5 mm. This particular marginal point was selected since it corresponds to the "hundred-mil circle" commonly required in gunsights. For practical purposes this determines the curvature of the reticle 77 since its vertex must be 47.3 mm. from the element 80 and it must pass through a circle 4.8 mm. radius located .81 mm. in front of the vertex. The tangential field of the lens is theoretically not truly spherical but the difference is negligible as far as any practical reticle curvature is concerned. A special modification is discussed in connection with Figures 19 and 20.

The maximum relative aperture which each collimator lens has is determined primarily by the form of lens used and the image quality desired. Larger relative apertures permit larger actual apertures for any given focal length which in turn reduces the number of collimators required to cover any given area. The focal length of each collimator is limited very definitely by the space available. On the other hand there is a minimum relative aperture since the diameter of the lens must effectively equal or exceed the diameter of each reticle. Obviously the reticles cannot overlap appreciably and if the lenses were smaller in diameter than the reticles, there would be spaces or gaps between the lenses apparent and objectionable to the observer. Actually of course there may be a small space between the lenses without being apparent providing this space is less in width than the diameter of the pupil of the observer's eye. In fact one preferred embodiment of the arrangement shown in Fig. 1 for example has a slight spacing between the elements 25 so that the effects of thermal expansion will be due solely to the expansion of the plate 27. The change in the separation of the axes of the lenses due to thermal expansion of the plate 27 is quite harmless if the reticles 28 change in separation by a like amount. Thus the plates 27 and 29 should preferably be of identical materials and the elements cemented to these plates should be very slightly spaced from one another.

In the embodiment in which the front surface 81 is aspherical the following specifications have proven satisfactory. Each unit is pressed from cane glass (index 1.51) having an axial thickness of 4 mm. and is mounted by cementing onto a plate glass (index 1.52) 6.0 mm. thick shown by broken lines 82. The aspheric surface can be defined with reference to an origin at the vertex of the surface. If the height or distance from the axis is defined as Y and the separation or sag from the tangent plane at the vertex is defined as X, the aspheric surface according to the equation $$X = .0235735\ Y^2 + .0000059\ Y^4$$

will give a lens (not including the effect of the plate 82) having an equivalent focus of 41.6 mm. It is noted that the paraxial radius of curvature for this surface is about 21.2 mm. The center of the reticle 77 should be located at a distance of 35.0 mm. behind the glass plate represented by broken lines 82. The hundred-mil circle in this case will be approximately 4.0 mm. from the axis and the concavity of the reticle is such that this circle should be .66 mm. in front of the center of the reticle.

For simple lenses, even for those with aspherical surfaces, a maximum relative aperture of $f/2.5$ is about the limit giving satisfactory definition. Higher relative apertures may be used merely by employing more complicated lenses including a plurality of elements corrected in accordance with the same rules as employed in the design of photographic objectives. The focal lengths of the collimators may have any value except as limited in one direction by the space available and in the other direction by the manufacturing difficulties encountered when small focal length systems are attempted.

In certain applications of the present invention it is desirable to have individual collimator units which can be assembled to cover any desired area. Fig. 9 shows a front elevation of such a set of units assembled in a group of seven as in Figs. 1 to 3. In Fig. 9 each unit 90 consists of a hexagon prism of glass or other transparent material with convex ends 91 and 92. The reticle is engraved or otherwise mounted on the surface 92 and the surface 91 provides the necessary dioptric power to constitute a collimator. The hexagonal shape of the units permits them to be juxtaposed accurately as represented in Fig. 2. Each unit in Fig. 9 is provided with its own lamp 93 the brightness of which is individually controlled by a variable resistance 94 shown diagrammatically.

Under certain circumstances such as when a target is approaching the sun, the operator or observer may wish this to change rapidly from a reticle of one brightness to one which is considerably brighter. An objectionable amount of time would be consumed if this brightness change had to be made by some mechanical adjustment such as by changing the resistance 94. Therefore in one very special embodiment of the invention some of the reticles are more brightly illuminated than others. The observer then merely moves his head in order to select the reticle brightness he desires. Usually the majority of the reticles are illuminated at some standard value and one or a group of them toward one side of the sight are illuminated more brightly for this purpose. This same feature is useful when a sight according to the broad aspects of the invention includes in addition to the group of collimators with identical reticles, a calibrated row of collimators with successively larger circular reticles for approximate stadiametric ranging. The apparent position of the center of the aiming pattern (i. e. the point corresponding to the axis of collimation) still remains unchanged from one collimator to the next. The point of aim is not disturbed by the fact that the circles are of different sizes.

Fig. 10 shows a single collimator unit 96 similar to that shown in Fig. 9 but having a lamp 97 and reflector 98 integrally attached to the reticle end of the hexagonal prism. Obviously any number of such units can easily be assembled to give the present invention.

Figs. 11 and 12 are perspective views of an embodiment of the invention which cooperates with stereoscopic vision. Both of these figures are drawn in perspective which lends a certain degree of realism which might tend to be slightly misleading but which is purposely employed since the operation of this embodiment is more clearly illustrated by these drawings than it would be if the beam combining mirror corresponding to element 21 of Fig. 1 were included. That is, Figs. 11 and 12 are drawn in accordance with the convention adopted in connection with Fig. 4 which in turn is in accordance with the images indicated by broken lines 36 and 37, in Fig. 1. Actually the lens elements in Figs. 11 and 12 are located vertically above the reticles in each case and a semi-transparent mirror sends the light from the collimators to both eyes which then see the reticles at a point in space at a specified distance from the observer and superimposed on a target. The optical principle however of these particular embodiments is best explained by having the observer view the collimated system directly with both eyes. Obviously the reticle image as thus seen may be combined in any way with light from the target and if it simplifies visualization of the beam combining process, the target can be considered to one side of the observer with a semi-transparent mirror oriented vertically at 45° to the line of sight may be immediately in front of the eyes for receiving light from the object and directing it into alignment with the reticle beams shown.

The purpose of the embodiments in Figs. 11 and 12 is to present the reticle image to be viewed binocularly and specifically so that its apparent distance produced by the stereoscopic effect will have some fixed critical value. For example the reticle can be made to appear just at the maximum useful range of a gun and the observer will then know that he should delay firing until the target comes within the range represented by the reticle distance. In Fig. 11 the reticles 100 are all located on a curved surface (spherical or cylindrical) whose radius of curvature 101 is equal to the fixed distance in question. Similarly the collimator elements 102 are located on a curved surface whose center of curvature is at the fixed distance. Through each collimator lens (considering one eye only) the observer sees an image of the reticle at an apparent distance depending on the focus of the collimator. This apparent distance may be infinity if the reticle is exactly in the focal plane of the corresponding collimator. Alternatively if the reticle is slightly nearer the lens element than the focal plane, the virtual image will be at some finite distance. This particular distance however is not the one which controls the apparent distance when viewed stereoscopically. The stereoscopic effect depends upon the divergence of the beams reaching the right and left eyes of the observer even if the virtual image in each case is at infinity. The divergence and hence the apparent reticle distance due to stereo effects depend on the divergence of the optic axes of the collimators as defined by the line joining the center of the reticles to the center of the corresponding lens element. Since these lines 103 diverge from a point 104 the stereoscopic effect makes the reticle appear at the point 104.

In Fig. 12 this same effect is obtained without curving the mutual reticle plane (the individual reticles may still be each on a curved plane) or the mutual plane of the collimator lens elements. The divergence of the collimator beams is obtained by having the reticles 106 slightly closer together than the lens elements 107. The effective axes of the collimators, except for the center one of course are thus slightly diagonal to the optic axis of the lens element itself. It is less important to have the extra spacing of the lenses occur vertically than it is horizontally since the stereo effect is entirely due to the horizontal divergence.

In any of the embodiments of the invention, the collimation of the light need only be approximate and the virtual image of the reticle need not be exactly at infinity. It can appear at any specified distance from the observer and should preferably be exactly at the target distance, but it is still quite useful if it only approximates the target distance. In the stereoscopic embodiment of the invention just described in connection with Figs. 11 and 12 this virtual image distance can be made to correspond exactly to the apparent distance due to the stereo effect. That is the reticles can be located in the plane conjugate to the desired reticle distance with respect to the elements 102 of Fig. 11 or 107 of Fig. 12. This is not essential however and the virtual image of each reticle may even be nearer than the apparent reticle distance. Thus the apparent distance of each virtual image separately is quite independent of the apparent distance caused by the stereoscopic effect, the latter usually being the controlling one for a normal observer, whereas the former is the one which should match the object distance if parallax is to be completely avoided.

In prior infinity sights using only a single lens, the possibility of using a concave reflector instead of the lens has been suggested. The advantages of such an arrangement can be obtained when combined with the fundamental feature of the present invention resulting in an exceptionally useful embodiment of the invention. One such arrangement is shown in Fig. 13. The individual collimators, juxtaposed according to the present invention each consist of a semi-transparent concave reflector 110 through which the target or object is viewed directly. To be sure that the target beam is unaffected by the concave reflector 110, this reflecting surface is located between a plano-concave element 111 and a convex plano element 112 having a total power equal to zero. The individual units are juxtaposed by cementing to a transparent sheet 113. Approximately at the focus of each concave reflector there is located a reticle 115, all of the reticles being mounted on a transparent sheet 116. This particular embodiment of the reticle consists of a highly reflecting surface 117 as shown in Fig. 14 separated by transparent areas so as to interfere least with the object beam. The actual reticles are quite small and in general it has proven unnecessary to bother having shields to prevent the light from one reticle reaching the wrong collimator. This is partly due to the fact that the light from any reticle traveling to a concave reflector adjacent to the one corresponding to that reticle would be directed from the sight at such a large angle that the observer would not tend to notice it. However, a honeycomb of small shields 118 may be provided for cutting off even this type of objectionable image at least partly. Alternatively and preferably the illumination of each reticle is such that light passes only to the corresponding collimator element; shields are then quite unnecessary. The small unmagnified images of each reticle seen by front surface reflection in the elements 112 can be reduced by an optical interference coating on this surface and in any case are no more objectionable than the reticles themselves through which the object is viewed. Such images all appear quite close to the eye and are not at all annoying when the eye is focused on the distant target upon which the reticle image is superimposed.

This reflecting embodiment of the present invention is particularly useful in a camera view finder wherein compactness is important. Such an arrangement is shown in Fig. 15 in which the reticle supporting plane 120 and the reflector supporting plane 121 are both hinged so as to protrude from the camera only when in the operative position shown. When individual collimators of smaller relative aperture are used, the quality of the reticle image is improved, but of course there must be a reticle to correspond to each collimator. The reticles for a camera view finder are rectangular in shape, but generally speaking this does not mean that any portion of the semi-transparent reflector 110 may be left completely transparent since as the observer's head moves around (the permission of which is the object of the present invention) different portions of each reflector are used for directing the reticle beam to the observer's eye.

In Figs. 16 and 17 a modified form of the invention is shown in which the juxtaposed collimator feature is employed only to obtain lateral extension of the exit pupil of the sight. Vertical extension of this pupil is obtained by successive reflectors acting as beam combiners. Light from a lamp 125 illuminates a reticle engraved on a concave surface 126 and the reticle beam is collimated by a lens 127 which directs the beam upwards to a beam combiner 128. Optically behind the beam combiner are located similar semi-reflector surfaces 129 and 130 in succession. These surfaces may be the opposite sides of a thick glass or other transparent plate. While three such surfaces are shown as best illustrating the principle of the invention, the most useful embodiment of the invention has only two such surfaces on opposite sides of a thick plate. Two such plates may be cemented together with a semi-transparent coating between them. The plates may extend far beyond the beams of light reaching the observer's eye, but in the embodiment shown the plates are cut off and surfaces 131 and 132 are polished so as not to interfere with direct viewing of the target or object. The collimator makes the reticle image appear at infinity and hence there is no apparent shift in the position of this reticle image as the observer moves his head vertically up and down to receive the combined beams from successive reflectors 128, 129, and 130. In fact the observer is not inconvenienced in any way if he receives part of the reticle beam from one reflector and part from another. It is noted that the successive beam combiners are equivalent to an extension in the number of juxtaposed collimators in a direction parallel to the observer's line of sight. There is no exactly equivalent arrangement which will extend the exit pupil laterally and for this reason the juxtaposed collimators according to the present invention are used for this purpose.

Fig. 18 shows a modification of the above system in which a light source 135 illuminates a reticle engraved or otherwise mounted on the curved surface of a transparent element 136. Light from this reticle is collimated by a cemented doublet lens 137 and directed successively through semi-transparent reflectors 140 and 141 to a reflector 142. The collimated beams reflected from all three of these elements are received by a beam combining reflector 143 which directs them into alignment with light from the target, both beams being received by the eye 144 of an observer. To insure that the apparent brightness of the reticle is about the same over the whole exit pupil, the reflector 140 should reflect about ⅓ of the light received and transmit about ⅔; the reflector 141 should be about 50 per cent reflecting, 50 per cent transmitting and the reflector 142 should be 100 per cent reflecting. It will be noted that the reflectors 140 to 142 are successively larger in diameter in order to cover the cone of light from the collimator 137.

This Fig. 18 shows a form of reticle which is applicable to the other embodiments of the invention and also to infinity sights in general. An enlarged detailed view of this element appears as Fig. 19. It will be noted that the reticle consisting of crossed lines and two concentric circles is engraved on a surface which is partly curved and partly flat. The center point 145, the 50 mil circle and the 100 mil circle are all located on a curved surface which theoretically should be a paraboloid matching the tangential field of the lens 137. A spherical surface is, for all practical purposes, well within the accuracy of this system however. In simple lens systems and even for cemented doublets such as 137, the tangential field represented by broken lines 150 is usually more highly curved than the sagittal field 151. Thus radial lines appearing in the reticle do not give as sharp an image as the circular lines in the zone of the 100 mil circle. Therefore this preferred form of reticle is engraved on the curved surface 150 only out to the 100 mil zone. From this point on it is engraved on a flat surface which approximately reaches the sagittal field 151 at the extreme edge 148 of the reticle.

The apparent image resulting from this system appears in Fig. 20. Since the center 145 and the circles 146 and 147 lie accurately in the tangential field, these all appear sharply in the image represented by points 145', 146', and 147'. However the radial lines of the reticle become more and more diffuse as one goes out from the center point 145 and become obviously quite wide as indicated at 152 in the region of the 100 mil circle. If the reticle were all engraved on a curved surface by continuing the curved surface all the way to the edge, these radial lines would continue to become more and more fuzzy and fan-shaped which would be particularly objectionable as the head moved from one collimator to the next. Due to the flat portion of the reticle surface, however, the fuzziness of the radial lines drops off and these lines become quite sharp at their tips as indicated by the point 148'. When the collimator lenses are large compared to the pupil of the observer's eye, the aberration does not appear as fuzziness but rather as a distortion or curving and twisting of reticle lines as the eye moves about. The curving stays within the limits shown by the shaded area 152. This reticle has proven to give a satisfactory image. Another approximation which is quite good involves a reticle partly on opposite sides of a transparent sheet, the central portions of the reticle including the 50 mil circle being printed on one side and the marginal portions including the 100 mil circle and the outer ends of the radial lines being printed on the front surface. Although the image definition required for accurate sighting is very high, these various approximations appear sufficiently to compensate for field curvature.

In Fig. 21 is shown a form of reticle illumination which is applicable to various embodiments of the invention. This being a horizontal section, there are several units adjacent to one another in the reticle 136. Light from lamps 153 is reflected by curved surfaces 154 which are preferably paraboloids of revolution with the lamps 153 at the respective foci. The surface 154 is preferably slightly diffusing to produce a cone of light covering the desired angle. If the reflectors 154 are entirely specular the light sources must be extended by having a ground glass or other diffuser in front of the light or by having a large diffuse reflector behind it as shown.

Fig. 22 shows the step of exposing a photosensitive surface in preparing the reticles. Light from a lamp 155 is diffused by an opal or ground glass 156 to illuminate uniformly a master reticle carefully engraved or drawn on a transparent sheet 157. Light from this reticle is collimated by a large collimator lens 158 so that there is a virtual image of the reticle at infinity. The collimated light, apparently from this virtual image, is focused by the individual collimator lenses 159 to expose a photosensitive layer 161 coated on the front surface of a reticle bearing element 160. This layer is then processed, preferably in situ, to a reticle. Since the reticles are all photographs of the same master reticle they will be identical and will be correctly located with respect to the corresponding collimator lens. Furthermore any error in the location or shaping of a collimator lens will produce a similar error in the reticle in a direction tending to compensate for the error in the collimator. As an alternative to this photographic system I have found that it is quite satisfactory, with an arrangement such as shown in Fig. 1, to adjust the reticle positions individually. That is, the lenses can all be made up in a single plate and each reticle adjusted manually until it appears superimposed on a master reticle at infinity produced by the system shown in Fig. 22.

Having thus described the preferred embodiments of my invention I wish to point out that it is not limited to these structures but is of the scope of the appended claim. In this claim the terms are intended to have the same scope as used in the present specification.

I claim:

A camera view finder comprising a plurality of juxtaposed collimators with parallel axes and having a rectangular reticle corresponding to the field of view of the camera at the focus of each collimator, semi-transparent reflector means for combining light from the collimators with light from the field of view of the camera and means for mounting the finder on the camera with the semi-transparent reflector means hingedly movable between a closed position and the operative position in which it so combines light.

RAYMOND W. WENGEL.

REFERENCES CITED

The following references are of record in the file of this patent:

UNITED STATES PATENTS

| Number | Name | Date |
| --- | --- | --- |
| 1,678,493 | Albada | July 24, 1928 |
| 1,930,498 | Wright | Oct. 17, 1933 |
| 1,985,067 | Wandersleb | Dec. 18, 1934 |
| 2,042,049 | Heidenhain | May 26, 1936 |
| 2,187,057 | Sauer | Jan. 16, 1940 |
| 2,217,930 | Zimmermann | Oct. 15, 1940 |
| 2,313,204 | Morelle | Mar. 9, 1943 |
| 2,357,913 | Sigford et al. | Sept. 12, 1944 |
| 2,393,308 | Brown | Jan. 22, 1946 |
| 2,393,832 | Stechbart | Jan. 29, 1946 |

FOREIGN PATENTS

| Number | Country | Date |
| --- | --- | --- |
| 437,444 | Great Britain | Oct. 28, 1935 |